June 10, 1969 — C. M. WESTBROOK — 3,448,610
TORQUE METER
Filed April 21, 1967
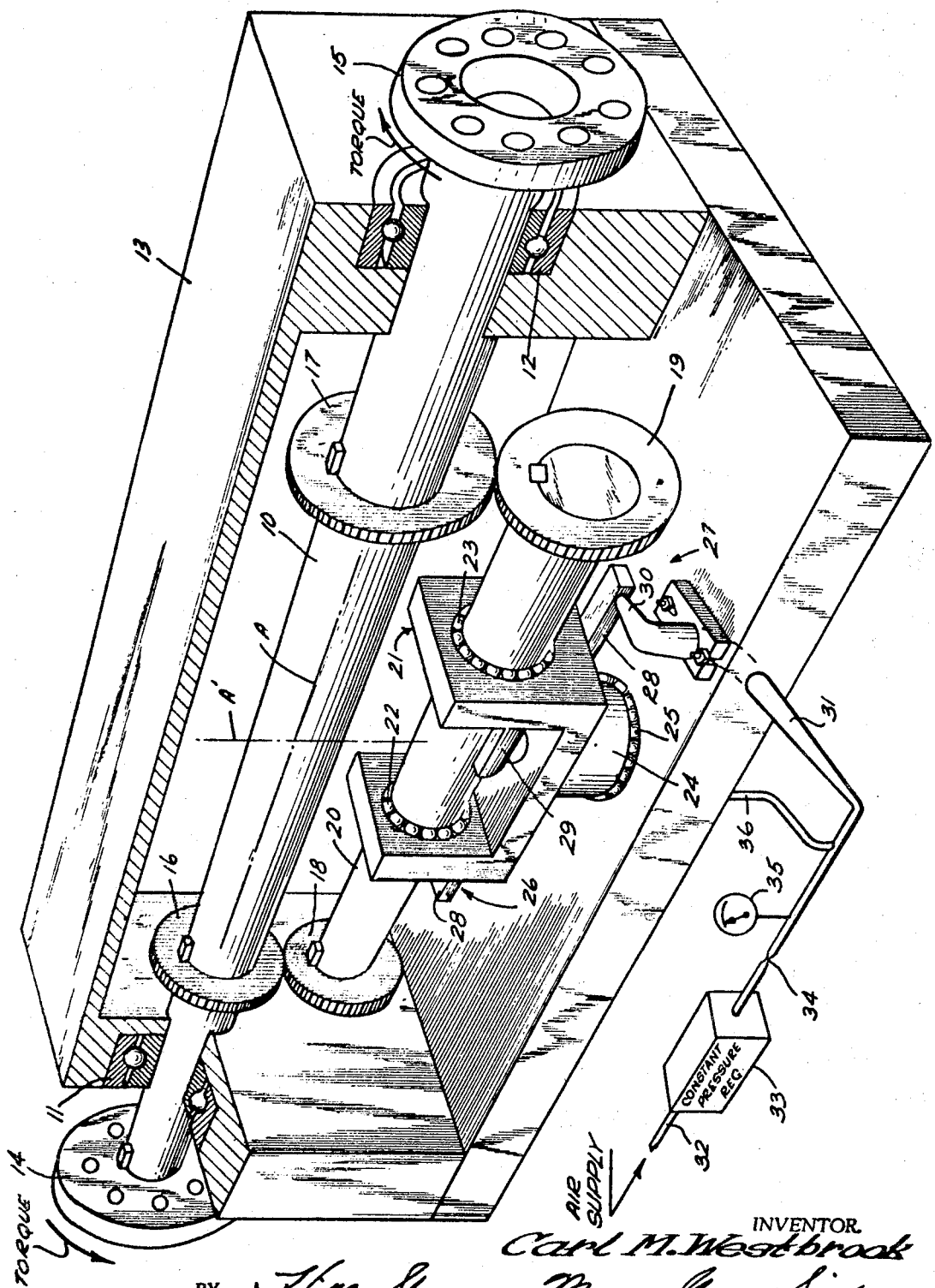
INVENTOR.
Carl M. Westbrook
BY
ATTORNEYS United States Patent Office 3,448,610
Patented June 10, 1969

3,448,610
TORQUE METER
Carl M. Westbrook, Beloit, Wis., assignor to Beloit Corporation, Beloit, Wis., a corporation of Wisconsin
Substitute for abandoned application Ser. No. 317,320, Oct. 18, 1963. This application Apr. 21, 1967, Ser. No. 632,729
Int. Cl. G01l 3/02
U.S. Cl. 73—136                 8 Claims

ABSTRACT OF THE DISCLOSURE

A torque meter embodying spaced gears on a shaft driving mating spaced gears on a parallel shaft and measuring displacement of the parallel shaft about an axis transverse thereto.

---

The present invention relates to improvements in torque measuring devices and more particularly to such a device which can measure the torque in a rotating or stationary shaft.

When a shaft or any other structural body is acted on by two or more sets of opposing couples it suffers a twist and every section of the shaft or body between the couples is subjected to a twisting moment, or torque. Since the amount of twist suffered by the shaft is related to the magnitude of the couples, it is apparent that if the angle of this twist is measured and certain other physical properties of the shaft are known, such as its modulus of elasticity, its diameter, and the distance over which the twist is being measured, then the amount of power being delivered by it, horsepower can also be calculated when the torque and the speed of the shaft are known.

Accordingly, it is an object of this invention to provide an apparatus for measuring the amount of twist suffered by a structural body such as a shaft, the amount of torque acting on the body, and the amount of power being delivered by it in accordance with these principles.

It is another object of the invention to provide a torque measuring apparatus for a shaft which can be installed without in any way weakening or affecting the physical characteristics of the shaft and without requiring cutting away or adding material to the shaft for forming passages or openings therethrough.

A further object of the invention is to provide a torque measuring device which is well adapted for use on either stationary or rotating shafts and which can measure the torque transmitted by a power shaft continually during operation.

A still further object of the invention is to provide a torque measuring operation for a shaft in which the degree of sensitivity can relatively easily be set and which is well adapted for operation on shafts of a wide range of sizes and a wide range of torques.

A still further object of the invention is to provide a simple and effective torque meter which is a self-contained unit and can be installed on existing shafts and requires no slip rings or rotating seals and no physical contact between the output signal transducer and the rotating power transmitting shaft.

A still further object of the invention is to provide a torque measuring device for a power shaft which is not affected by a bending moment in the shaft.

Other objects, advantages and features will become more apparent with the teaching of the principles of the invention in connection with the disclosure of the preferred embodiment thereof in the specification, claims and drawings, in which:

The single figure of the drawing shows in perspective view a torque measuring device constructed and operating in accordance with the principles of the present invention.

On the drawing:

A power shaft or torque transmitting shaft 10 is illustrated rotatably supported in a frame 13 which carries spaced bearings 11 and 12 for the shaft. The shaft is shown with connectors 14 and 15 at its ends and the arrowed lines marked "TORQUE" illustrate schematically the effective torque along the shaft due to applying a load at one end and a resistance at the other end. As will be appreciated the shaft may be of any type and may be stationary or a rotating shaft. For example, the shaft may be part of a machine assembly and connecting the prime mover to the machine so that measurement of the current power input to the machine can be determined by measuring the torque in the shaft 10.

Mounted on the shaft 10 at axially spaced locations are first and second driving gears 16 and 17. These gears may be secured to the shaft in any suitable way and are shown keyed thereto but may suitably be affixed by set screws or light-weight mechanism which would avoid in any way cutting into the shaft.

First and second driven gears 18 and 19 are in mesh respectively with the driving gears 16 and 17 and are driven thereby. The driven gears 18 and 19 are non-rotatably connected to each other such as being mounted on a free shaft 20. The shaft 20 in supported in a location parallel to the power shaft 10, and maintains a parallel position as long as there is no twist in the power shaft due to torque being applied thereto. However, as soon as twist occurs in the shaft 10 due to a torque, relative rotation will occur between the driving gears 16 and 17 (due to the twist in the shaft) and consequent relative rotation will occur between gears 18 and 19. This will cause the free shaft 20 to swing or to shift its axial position relative to the power shaft 10, and this swinging movement is measured to determine the degree of twist of the shaft 10 and the torque therein.

The free shaft 20 is supported on a mount 21 which is shown in the form of a U-shaped block having sides supporting spaced bearings 22 and 23.

The mount 21 is supported for pivotal movement on a vertical axis A' which is transverse to and intersects the axis A of the power shaft 10. The axis A' is preferably exactly at the center of the free shaft, that is, midway between the driven gears 18 and 19. The mount is pivotally supported by means of a hub 24 beneath it supported in bearings 25.

It will, of course, be appreciated that slight deviations in the position of the mount at its axis are possible but for optimum accuracy the preferred relationship between parts is as above described. For example, the driving gears 16 and 17 may be positioned approximately eight inches apart in a suitable mechanism and the free shaft 20 will then have an eight inch length.

The driven gears 18 and 19, of course, must be accurately positioned on their shaft 20 so that each will be in driving engagement with the driving gears 16 and 17. So that some driving force is continually experienced and to insure immediate swinging movement of the free shaft 20 with any twist of the power shaft 10, a light brake load is applied to the free shaft 20 such as by a brake 29 supported on the mount and engaging the surface of the shaft 20. As torque is applied to the shaft 10, at any given moment, the teeth of gears 16 and 18 and gears 17 and 19 which are in engagement follow the torsional displacement and the axis of the shaft 20 will pivot around the axis A' of the mount 21. This movement is measured by a suitable transducer such as a pneumatic, hydraulic, electronic or optical or any combination of such. The output of such transducer may be manifested visually or may be connected to automatic controls for the power input to the machine or other devices which must be controlled as a function of torque in the shaft 10.

Transducers are shown in the form of air jet members 26 and 27, which are preferred because of their simple reliable construction and their being particularly well adapted to use in combination with the structure shown. The air jet systems include arms 28 supported at each side of the mount 21, and since each air jet arrangement is the same, only one need be described in detail. Air jet nozzles 30 are stationarily supported such as on the frame 13 and direct a flow of air toward the arm 28. Movement of the arm in either direction will increase or decrease the flow of air from the nozzle 30. An air supply line 31 connects to the nozzle 30 and a branch air supply line 36 leads to the other nozzle (not shown). A main air supply line 32 is provided with a regulator 33 for a constant pressure supply. The lines are shown with a gauge 35 which may be calibrated in terms of torque or in terms of pressure for conversion to torque. A pressure drop orifice 34 must be provided in the line for more accurate measurement of change in pressure in the line and to be registered on the gauge 35 as the flow of air through the nozzle 30 changes. A pressure signal can be taken off the line downstream from the orifice 34 and control or operate automatic equipment.

Thus it will be seen that there is provided a self-contained package unit which may be installed in any equipment where torque indication or control is desired. The unit has the advantage of requiring no slip rings or rotational seals nor any physical contact between the output measuring device and the rotating or stationary power transmitting shaft and is unaffected by a bending moment in the power transmitting shaft.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. A torsion measuring device for a torque transmitting shaft comprising,
    first and second rotational drive members for connection at spaced locations to the shaft,
    first and second driven members driven respectively by said drive members and rigidly connected to each other,
    a pivotal mount rotatably supporting said driven members for rotation about their axes and for movement about an axis transverse to the axis of the shaft,
    and means measuring rotational position change of said mount about said transverse axis for measuring the torque in said shaft.

2. A shaft torsion measuring device as defined in claim 1, wherein said measuring means includes an air jet member, an air flow impedance member, one of said members being stationary and the other of said members being mounted on said mount so that the flow of air from said jet member will vary as a function of the pivotal position of said mount, and means for measuring the flow of air through said jet member for measuring torque in said shaft.

3. A shaft torsion measuring device as defined in claim 1, wherein said measuring means includes an air jet member, an air flow impedance member, one of said members being stationary and the other of said members being mounted on said pivotal mount so that flow of air from said jet member will vary as a function of the pivotal position of said mount, and means for measuring the flow of air through said jet member for measuring torque in said torque transmitting shaft.

4. A shaft torsion measuring device as defined in claim 1, wherein said transverse axis of said mount passes substantially through said shaft and is substantially normal thereto.

5. A shaft torsion measuring device as defined in claim 1, wherein said first drive member includes
    a first driving gear for connection to the shaft at a first location,
    said second drive member includes a second driving gear for connection to the shaft at a second location axially spaced from the first,
    a free shaft rotatably supported on said mount and extending substantially parallel to the torque transmitting shaft,
    said first and second driven members including respectively first and second driven gears on said free shaft driven respectively by said first and second driving gears,
    said transverse axis intersecting the axis of said torque transmitting shaft,
    said measuring means including a stationary air jet,
    an air impedance arm on said mount moving relative to said jet with pivotal movement of said mount for changing the flow of air through the jet,
    a constant pressure air supply line connected to said jet,
    and means for measuring the change in flow through said nozzle for measuring torque in said torque transmitting shaft.

6. A shaft torsion measuring device as defined in claim 1, wherein said first drive member includes
    a first driving gear for connection to the torque transmitting shaft at a first location,
    said second drive member includes a second driving gear for connection to the torque transmitting shaft at a second location axially spaced from the first,
    a free shaft rotatably supported on said mount and extending substantially parallel to the torque transmitting shaft,
    said first and second driven members including respectively first and second driven gears on said free shaft driven respectively by said first and second driving gears,
    and said transverse axis intersecting the axis of said torque transmitting shaft.

7. A torque meter for measuring torque in a shaft comprising,
    a first shaft to which the torque is applied and having at least one end rotatable with respect to the other end thereof,
    a pair of gears axially spaced and fixedly mounted on the shaft,
    a second shaft mounted parallel to said first shaft and pivotally supported at the center thereof,
    a pair of gears on said second shaft meshing with the gears on said first shaft,
    and means for measuring the angle created due to the transmitted torque between the centerline of the first shaft and the centerline of the second shaft.

8. A torque meter as defined in claim 7, further including a mount located at the center of said second shaft and having axially spaced bearings rotatably supporting said second shaft, a rotational support for said mount having an axis normal to the axis of said first shaft and intersecting the axis thereof, said measuring means including diametrically opposed arms extending from said mount, first and second air jets positioned so that the arms impede the flow of air from said jets, constant pressure air supply lines connected to said jets, and means measuring pressure change in the lines with movement of said arms for measuring the torque in the torque transmitting shaft.

References Cited

UNITED STATES PATENTS

| 3,081,624 | 3/1963 | Mayer | 73—136 |
| 3,166,935 | 1/1965 | Sundt | 73—136 |

FOREIGN PATENTS

| 764,977 | 1/1957 | Great Britain. |

CHARLES A. RUEHL, *Primary Examiner.*